March 5, 1946.  C. N. HUSMAN ET AL  2,395,827
AIRPLANE SPRAY UNIT
Filed July 3, 1945
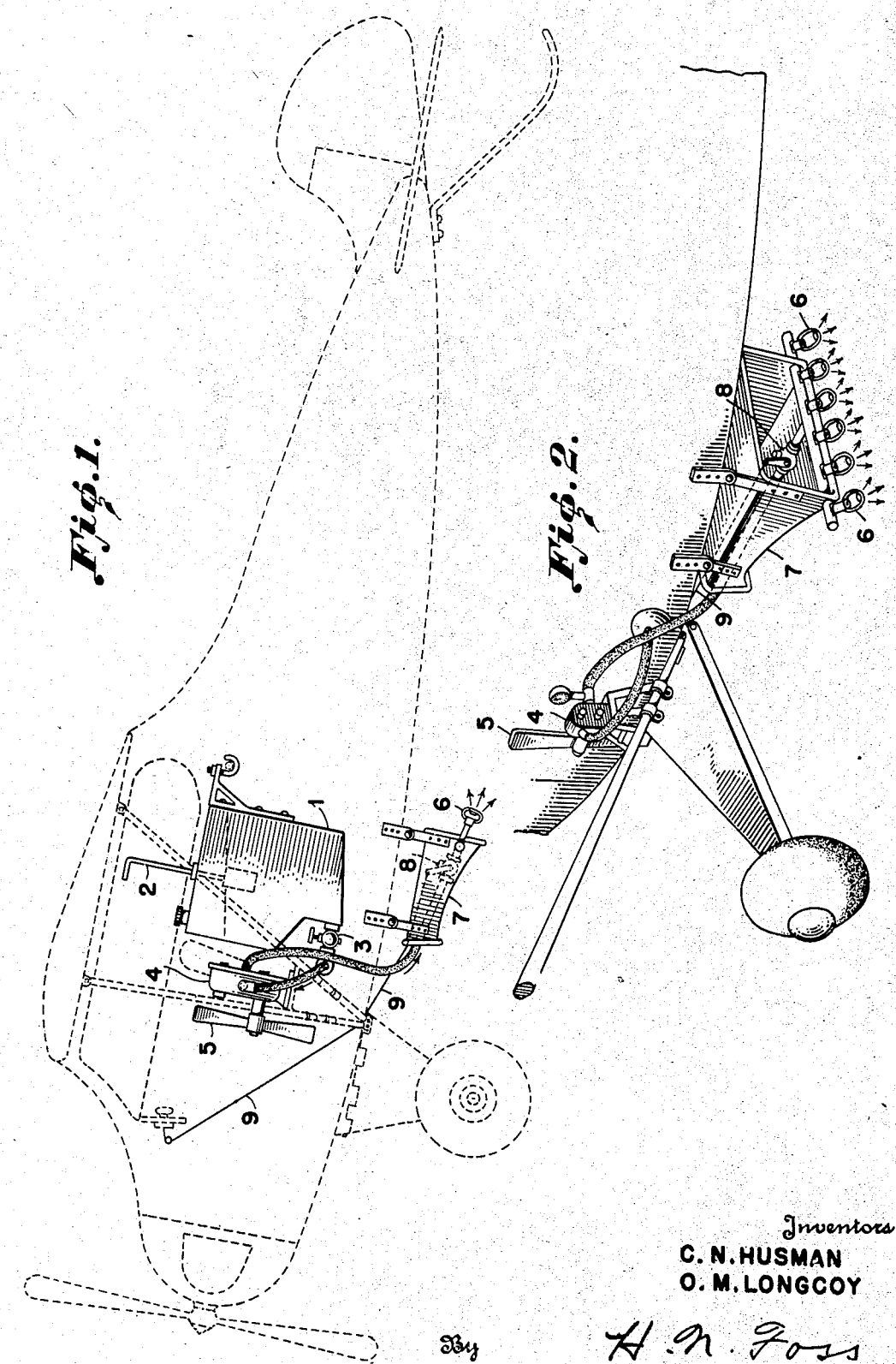
Inventors
C. N. HUSMAN
O. M. LONGCOY
By  H. N. Foss
Attorney Patented Mar. 5, 1946

2,395,827

UNITED STATES PATENT OFFICE 2,395,827

AIRPLANE SPRAY UNIT

Chester N. Husman and Olin M. Longcoy, Orlando, Fla., assignors to the United States of America as represented by the Secretary of Agriculture and his successors in office Application July 3, 1945, Serial No. 603,102

1 Claim. (Cl. 244—136)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to equipment for the distribution of insecticides and other spray materials from aircraft, and has among its objects the provision of equipment of this type which is readily mountable and removable and which will direct the flow of spray material downward in an even and uniform manner.

A preferred embodiment of the invention is illustrated in the accompanying drawing in which:

Figure 1 is a side view of an airplane equipped with a spray unit of the type described, and Figure 2 is a view in prospective showing the venturi assembly and spray nozzles in greater detail.

As illustrated, the spray unit comprises a tank 1 which is mounted within the fuselage. In an aircraft of the type indicated in the drawing, the tank 1 is conveniently mounted by attaching it to the rear seat brackets and top rear seat cross member with bolts or clamps. Similar means may be used in other types of aircraft. The tank 1 is equipped with a float gauge 2, suitable cover plates (not shown) to allow the tank to be filled, and an outlet valve 3. It is also desirable to arrange a baffle plate (not shown) longitudinally within the tank to keep the spray material from sloshing from side to side while in flight, and to add structural strength. The spray material is drawn from the tank 1 by a gear pump 4 which is clamped to the wing struts and is driven by a propeller 5. The pump 4 operates at a pressure of about 70 pounds. Spray material is delivered by this means to nozzles 6 located underneath the airplane in relation to a venturi 7. The venturi 7 is supported on brackets which are bolted to fittings arranged on the longerons. This method of mounting allows the venturi 7 to be spaced away from the fuselage so that a free air velocity is created above the venturi which results in better distribution of the spray material. The bottom of the venturi 7 is flared downward toward its trailing edge, and the spray nozzles 6 are mounted just beyond this edge. The nozzles 6 are preferably of the convex baffle spray type with a very fine orifice. A quick-action shut-off valve 8 is arranged in the venturi 7 to control the flow of spray material to the nozzles 6, and this valve 8 is operated by a control cable 9 which runs to the instrument panel of the aircraft.

Spray equipment of this type has been found to give very satisfactory results. It can be installed without structural change in aircraft with which it is used, and it can be mounted or removed in a relatively short period of time. The Venturi construction, together with the manner in which the venturi is spaced from the fuselage to provide an overhead free air velocity, directs the spray flow downward in a uniform and even swath, and obviates troublesome collection of the spray on the aircraft. The equipment has been approved by the Civil Aeronautics Administration and is licensed for N. C. aircraft.

Having thus described our invention, we claim:

An airplane spray unit of the type described comprising, in combination with an airplane, a liquid container positioned within the fuselage of said airplane, a venturi flared downward at its trailing edge arranged underneath and in spaced relation to the fuselage of said airplane, a plurality of spray nozzles provided at the lower trailing edge of said venturi, liquid conduit means connecting said spray nozzles with said liquid container, air-driven pumping means mounted externally on said airplane in cooperation with said liquid conduit means, whereby liquid in said liquid container can be delivered to said spray nozzles, and means for controlling liquid flow through said liquid conduit means.

CHESTER N. HUSMAN.
OLIN M. LONGCOY.